(12) United States Patent
He et al.

(10) Patent No.: US 7,419,542 B2
(45) Date of Patent: *Sep. 2, 2008

(54) 2,9-DICHLORO-QUINACRIDONE AS α-QUINACRIDONE CRYSTAL PHASE INHIBITOR

(75) Inventors: Yingxia He, Wilmington, DE (US); Colin Dennis Campbell, Claymont, DE (US); Gordian Schilling, Klettgau (DE); Rhonda Carter, Bear, DE (US); Melissa Wagner, Jefferson, OH (US); James Thomas Will, Bear, DE (US); Kevin Rodney Gerzevske, Wilmington, DE (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 50 days.

This patent is subject to a terminal disclaimer.

(21) Appl. No.: 11/488,875

(22) Filed: Jul. 18, 2006

(65) Prior Publication Data

US 2007/0034117 A1    Feb. 15, 2007

Related U.S. Application Data

(63) Continuation-in-part of application No. 10/988,227, filed on Nov. 12, 2004, now Pat. No. 7,101,428, which is a continuation-in-part of application No. 10/988,250, filed on Nov. 12, 2004, now Pat. No. 7,122,081.

(60) Provisional application No. 60/519,842, filed on Nov. 13, 2003.

(51) Int. Cl.
*C09B 48/00*    (2006.01)
*C09D 11/00*    (2006.01)

(52) U.S. Cl. .................... 106/497; 106/31.77; 106/495; 524/90; 544/49; 544/56

(58) Field of Classification Search .............. 106/31.77, 106/495, 497; 524/90; 544/49, 56
See application file for complete search history.

(56) References Cited

U.S. PATENT DOCUMENTS

| | | | | |
|---|---|---|---|---|
| 2,402,167 A | 6/1946 | Lang et al. | ............... | 260/314.5 |
| 2,816,115 A | 12/1957 | Howell | ..................... | 260/314.5 |
| 3,030,370 A | 4/1962 | Jackson | ....................... | 260/279 |
| 3,326,918 A | 6/1967 | West | ........................... | 260/279 |
| 3,607,336 A | 9/1971 | Jaffe | ........................... | 106/288 |
| 4,293,475 A | 10/1981 | Sidi | ............................ | 260/29.6 |
| 4,455,173 A | 6/1984 | Jaffe | ........................... | 106/288 |
| 4,597,794 A | 7/1986 | Ohta et al. | .................... | 106/20 |
| 4,857,646 A | 8/1989 | Jaffe | ........................... | 546/49 |
| 5,084,100 A | 1/1992 | Bauman | ..................... | 106/495 |
| 5,231,131 A | 7/1993 | Chu et al. | .................... | 524/504 |
| 5,383,966 A | 1/1995 | Johnson | ..................... | 106/493 |
| 5,432,036 A | 7/1995 | Beach et al. | ................. | 430/115 |
| 5,514,510 A | 5/1996 | Hayakawa | ................... | 430/108 |
| 5,530,043 A | 6/1996 | Zawacky et al. | ............. | 524/317 |
| 5,840,901 A | 11/1998 | Bäbler | ......................... | 546/49 |
| 5,955,232 A | 9/1999 | Little et al. | .................. | 430/106 |
| 5,989,333 A * | 11/1999 | Urban et al. | ................. | 106/495 |
| 6,056,814 A | 5/2000 | Kato et al. | .................... | 106/412 |
| 6,210,474 B1 | 4/2001 | Romano, Jr. et al. | ........ | 106/31.6 |
| 6,312,512 B1 * | 11/2001 | Urban et al. | ................. | 106/495 |
| 6,410,619 B2 | 6/2002 | Green et al. | ................... | 524/88 |
| 6,503,317 B1 | 1/2003 | Ortalano et al. | ............. | 106/493 |
| 6,916,862 B2 | 7/2005 | Ota et al. | ...................... | 523/200 |
| 7,101,428 B2 * | 9/2006 | He et al. | ...................... | 106/495 |

FOREIGN PATENT DOCUMENTS

EP    0496149    7/1992

OTHER PUBLICATIONS

English language abstract for JP 55089366 (1980), no month.
R. B. McKay, JOCCA, "Control of the Application Performance of Classical Organic Pigments", pp. 89-93, (1989), no month.

* cited by examiner

*Primary Examiner*—Anthony J Green
(74) *Attorney, Agent, or Firm*—Shiela A. Loggins

(57) ABSTRACT

The invention is directed to a method or use of 2,9-dichloroquinacridone as an alpha crystal phase inhibitor and optionally, 4,11-dichloroquinacridone during the beta-quinacridone or gamma-quinacridone crude pigment particle size reduction processes. The invention is also directed to solid solutions of quinacridone comprising about 98 to about 80 weight % gamma or beta-quinacridone, about 0.1 to about 10 weight % 2,9-dichloroquinacridone and about 0.1 to about 10 weight % 4,11-dichloroquinacridone.

25 Claims, 11 Drawing Sheets

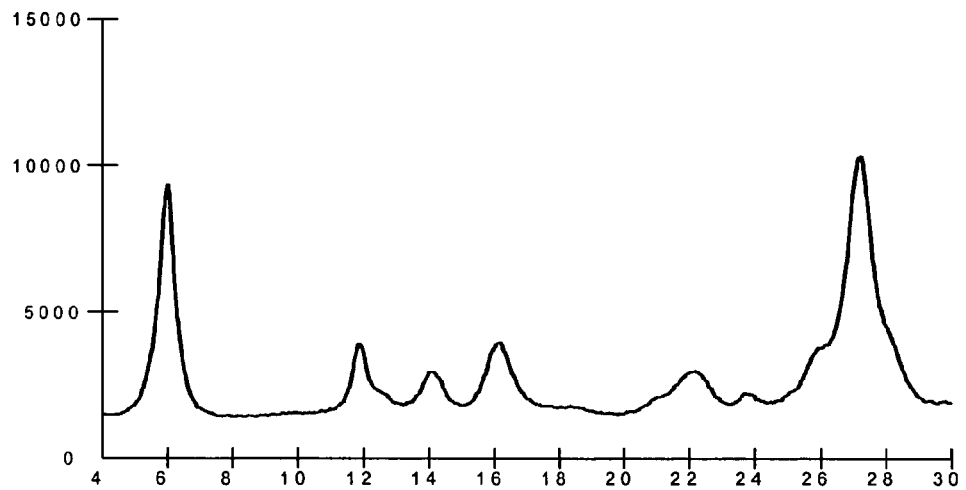
Figure 1. X-ray of example 1, aqueous wet-milled crude beta-quinacridone without 2,9-dichloroquinacridone.
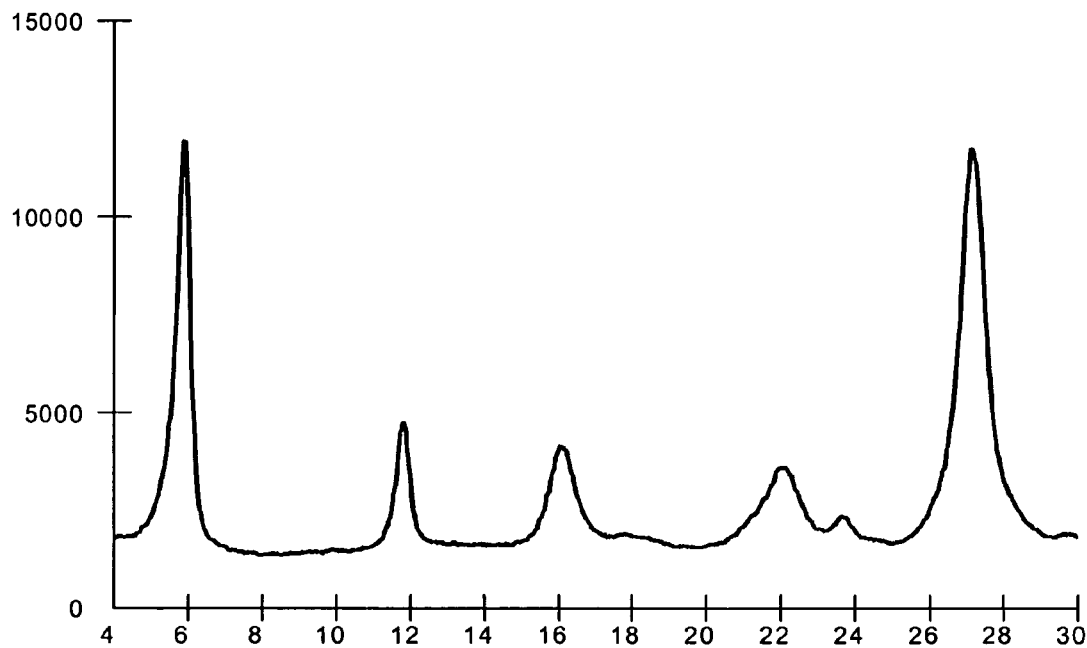
Figure 2. X-ray of example 2, aqueous wet-milled crude beta-quinacridone with 2,9-dichloroquinacriodone.

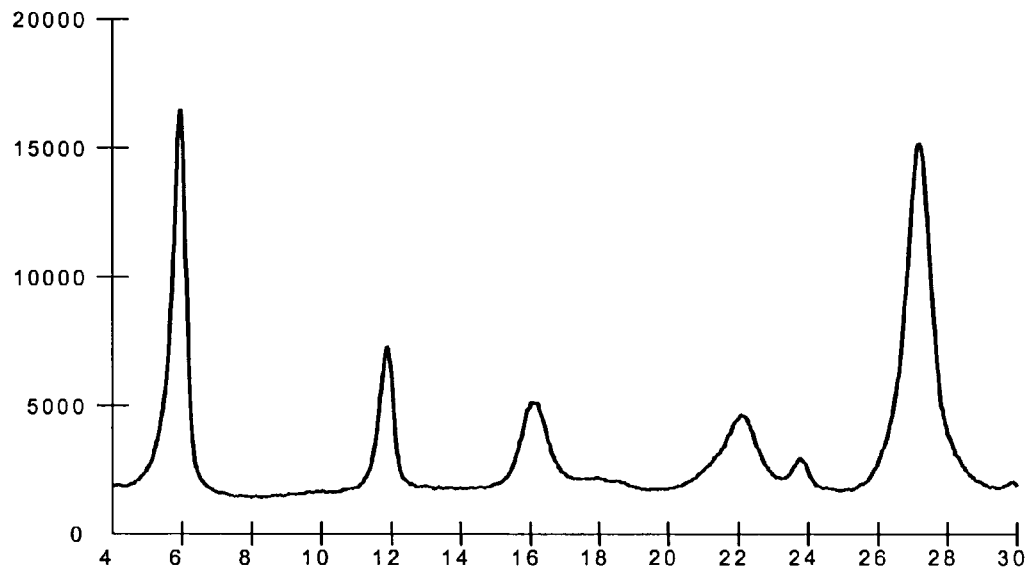
Figure 3. X-ray of example 3, aqueous wet-milled crude beta-quinacridone with 2,9-Cl$_2$QA
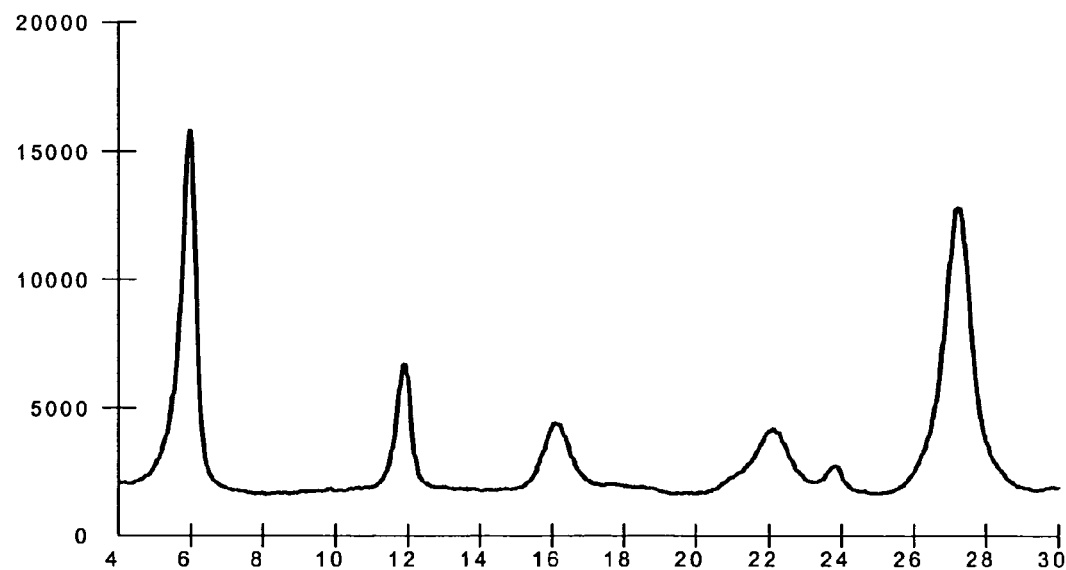
Figure 4. X-ray of example 4, aqueous wet-milled crude beta-quinacridone with 2,9-dichloroquinacridone.

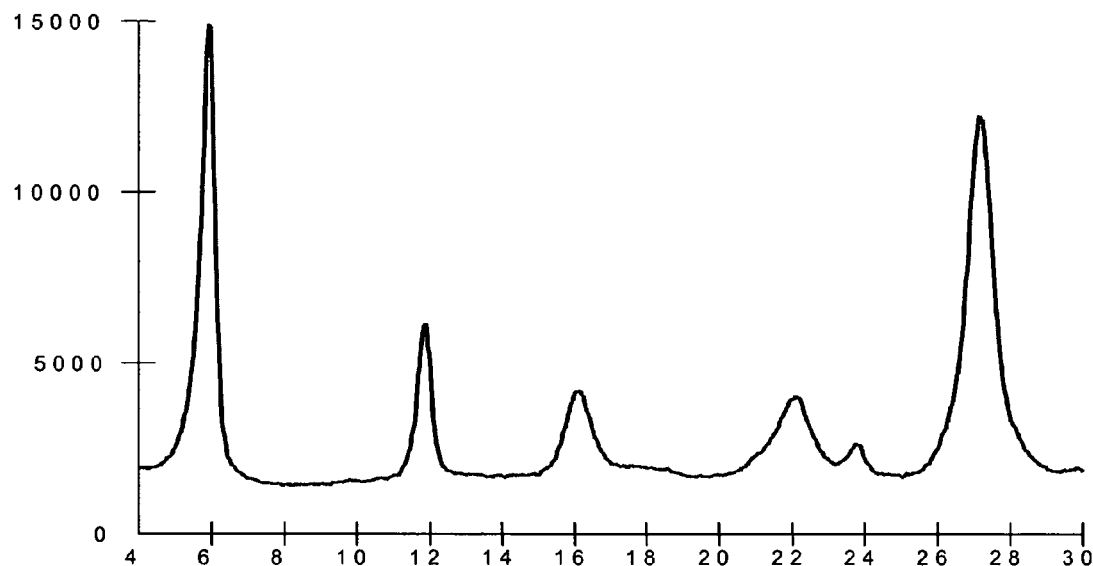
Figure 5. X-ray of example 5, aqueous wet-milled crude beta-quinacridone with 2,9-dichloroquinacrione.
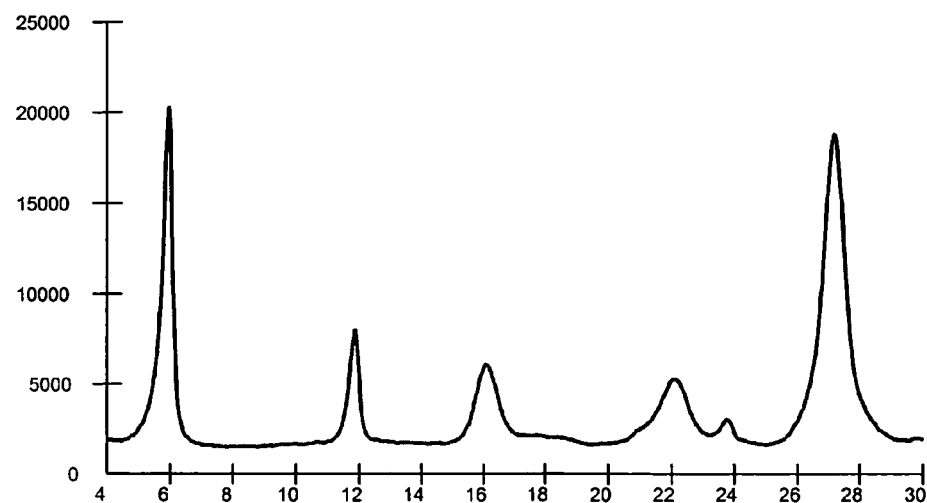
Figure 6. X-ray of wet-milled beta crude of example 6 with 0.5 % 2,9-dichloroquinacridone for 60 minutes.

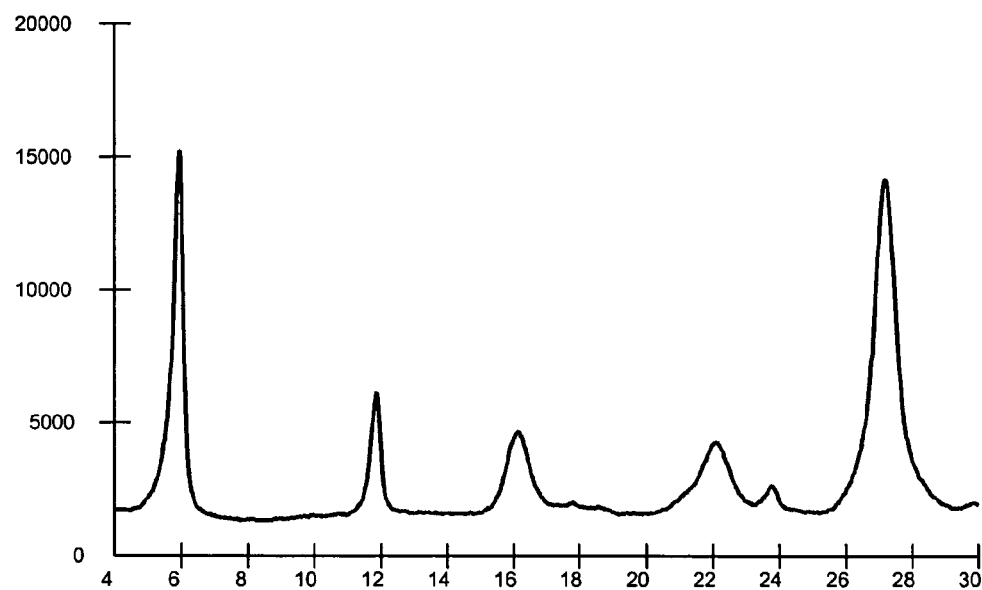
Figure 7. X-ray of wet-milled beta crude of example 7 with 0.5 % 2,9-dichloroquinacridone for 120 minutes.
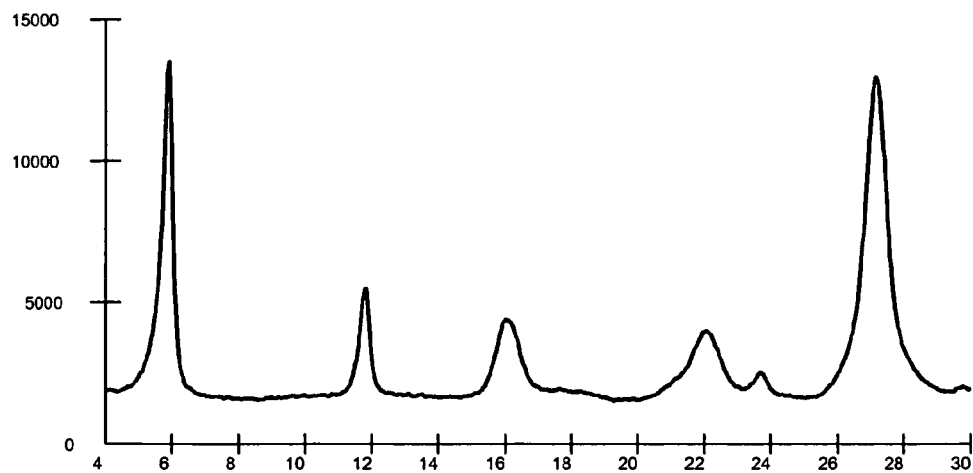
Figure 8. X-ray of wet-milled beta crude of example 8 with 1.0 % 2,9-dichloroquinacridone for 60 minutes.

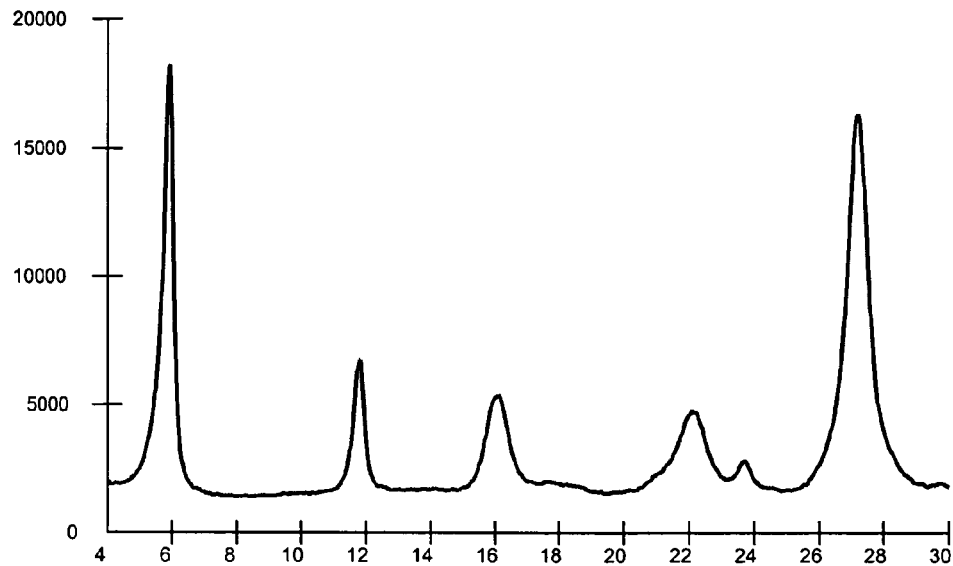
Figure 9. X-ray of wet-milled beta crude of example 9 with 1.0 % 2,9-dichloroquinacridone for 120 minutes.
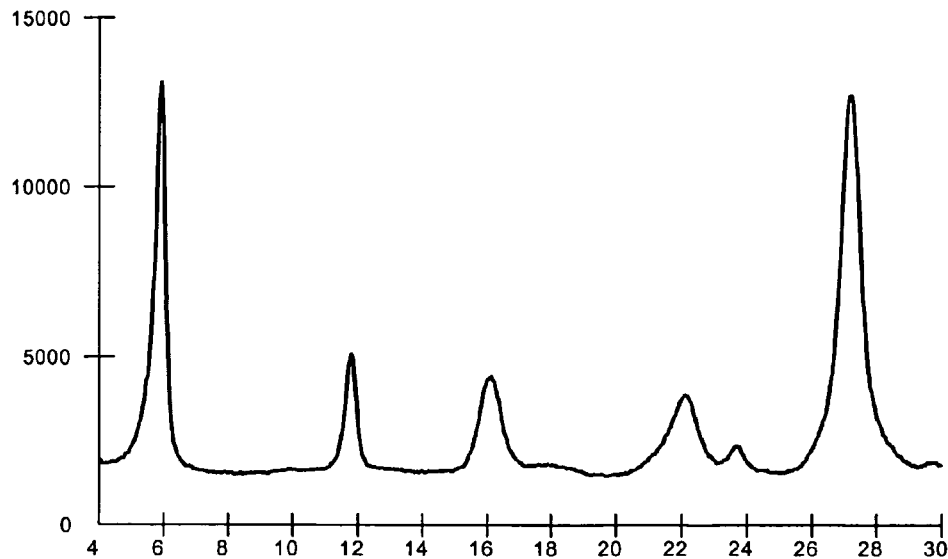
Figure 10. X-ray of wet-milled beta crude of example 10 with 2.0% 2,9-dichloroquinacridone for 60 minutes.

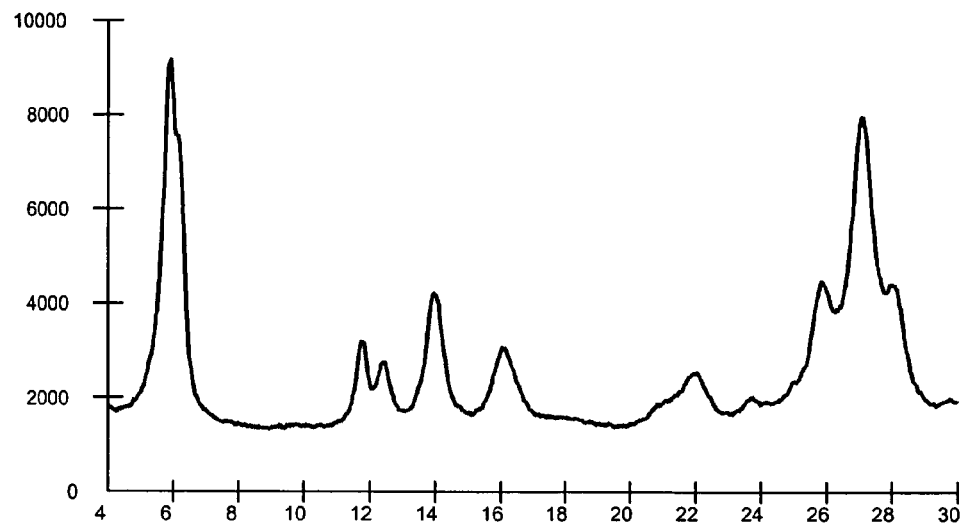
Figure 11. X-ray of wet-milled beta crude of example 11 with 2.0 % 2,9-dichloroquinacridone for 120 minutes.
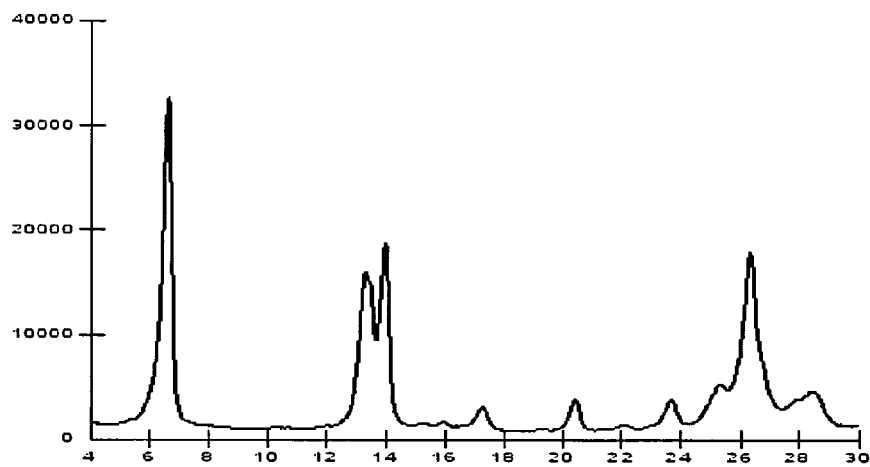
Figure 12 – Three component blended mixture of 2% 2,9-dichloroquinacridone and 1% 4,11-dichloroquinacridone with 97 % gamma quinacridone.

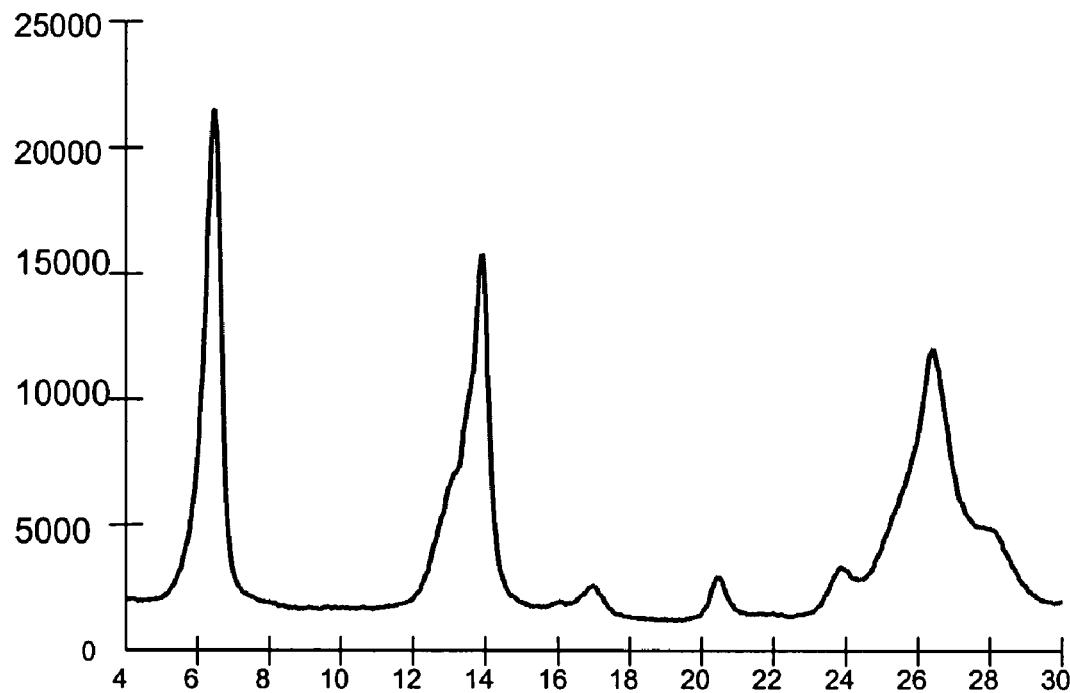
Figure 13. X-ray of wet-milled gamma crude of example 13 with 0.5 % 2,9-dichloroquinacridone for 30 minutes.
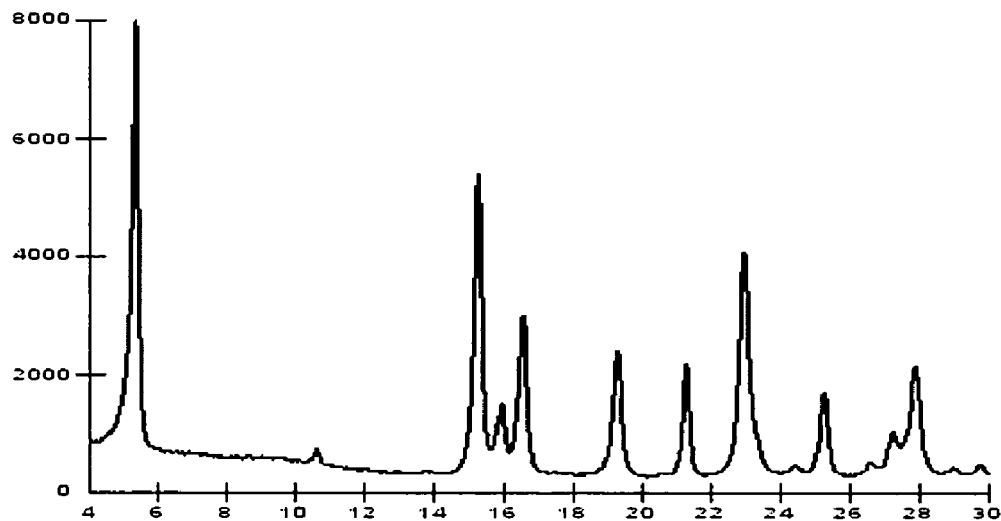
Figure 14 – X-Ray of 2,9 dichloroquinacridone.

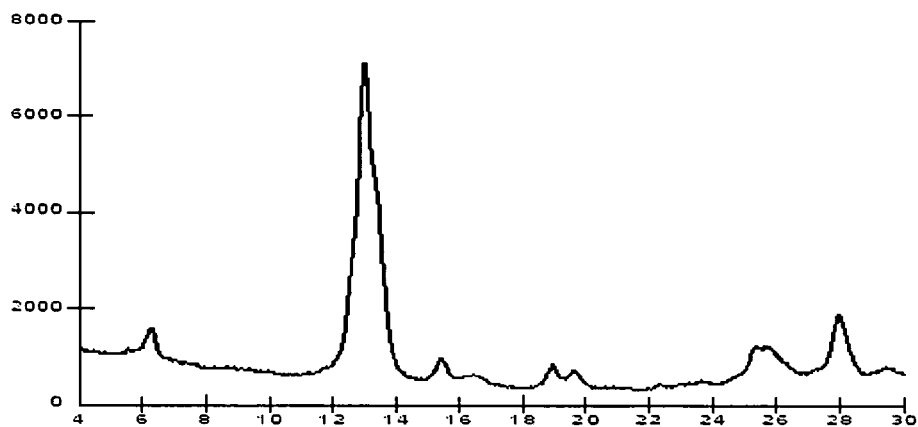
Figure 15 – X-Ray of 4,11 dichloroquinacridone.
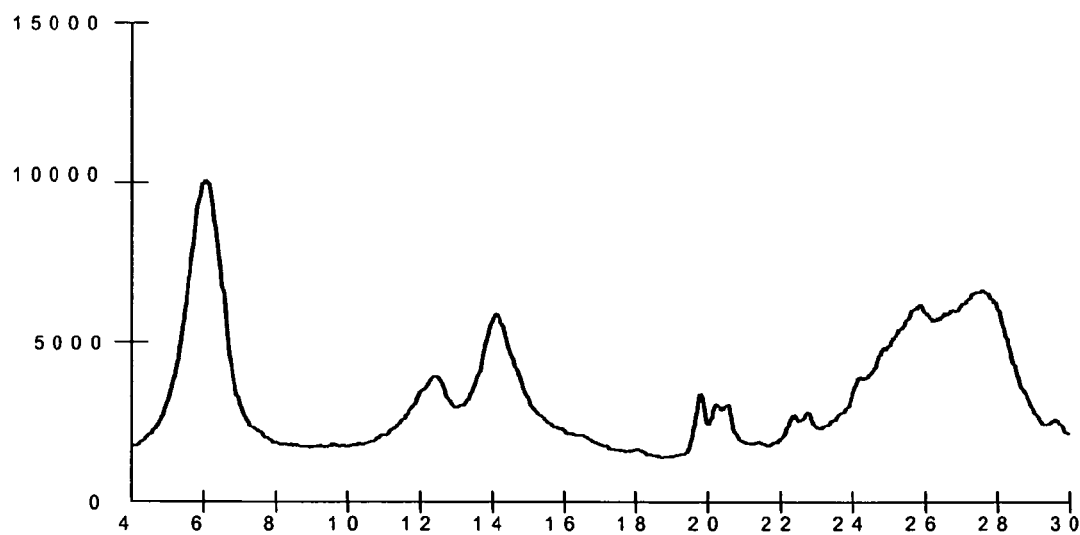
Figure 16. X-ray of alpha quinacridone generated from milling process

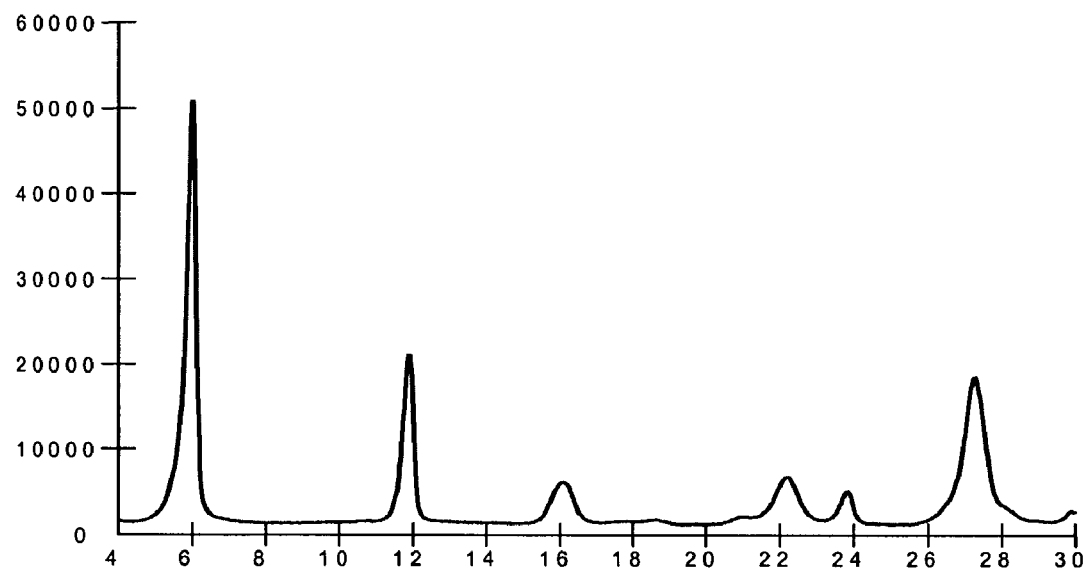
Figure 17. X-ray of pure beta-quinacridone
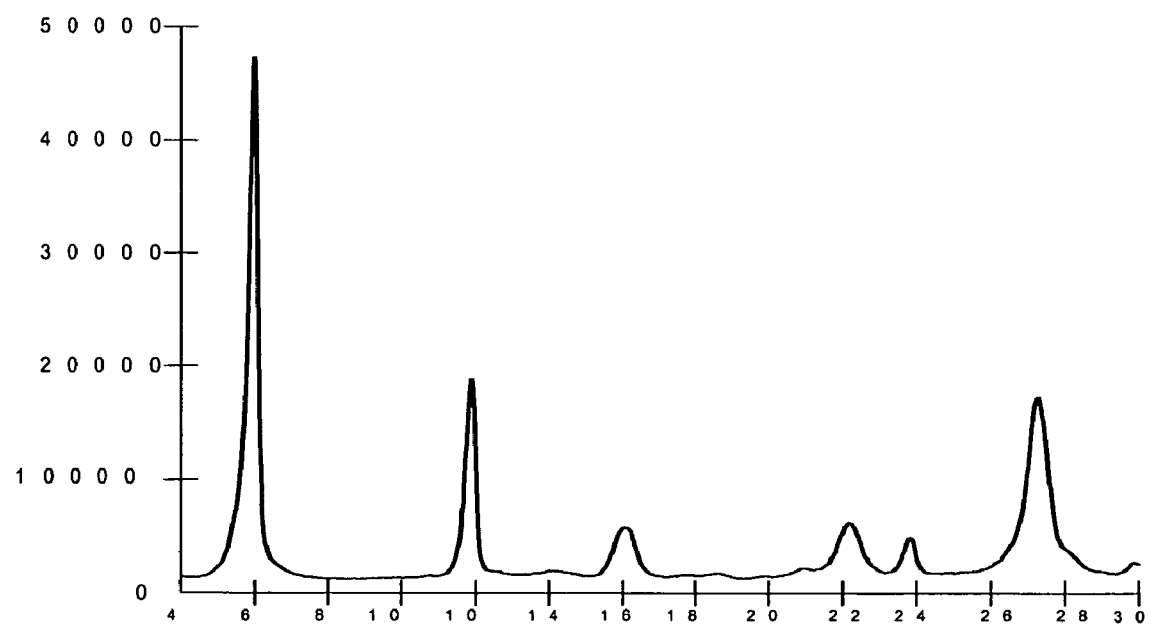
Figure 18. X-ray of Comparison example 1

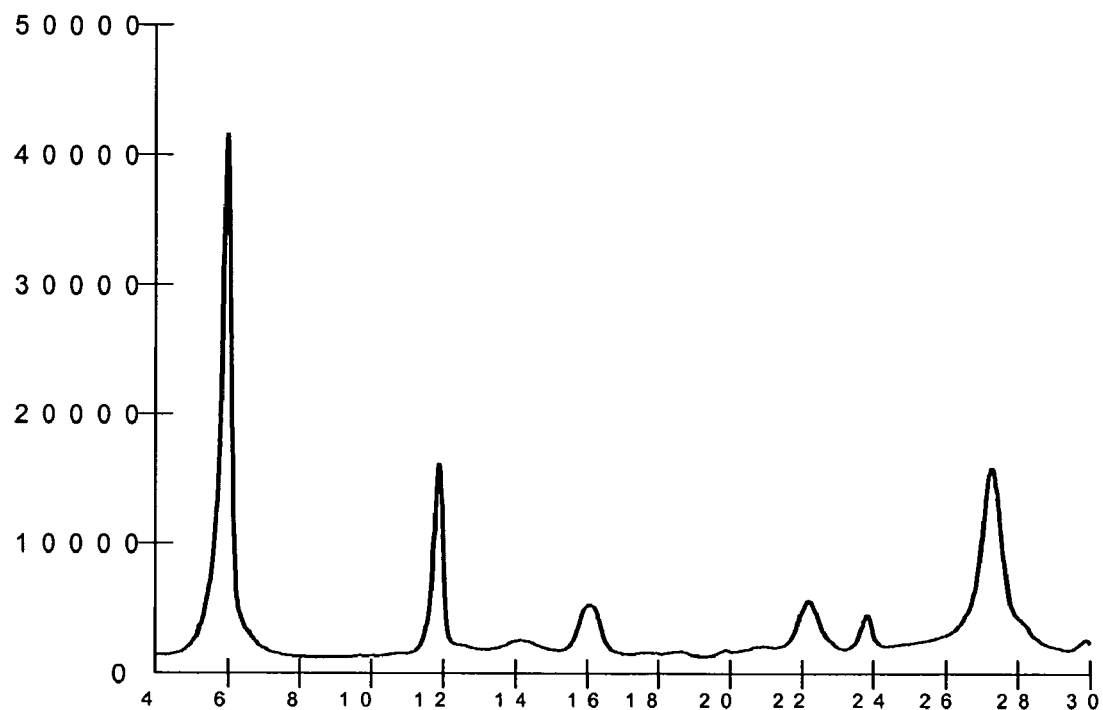
Figure 19. X-ray of Comparison example 2.
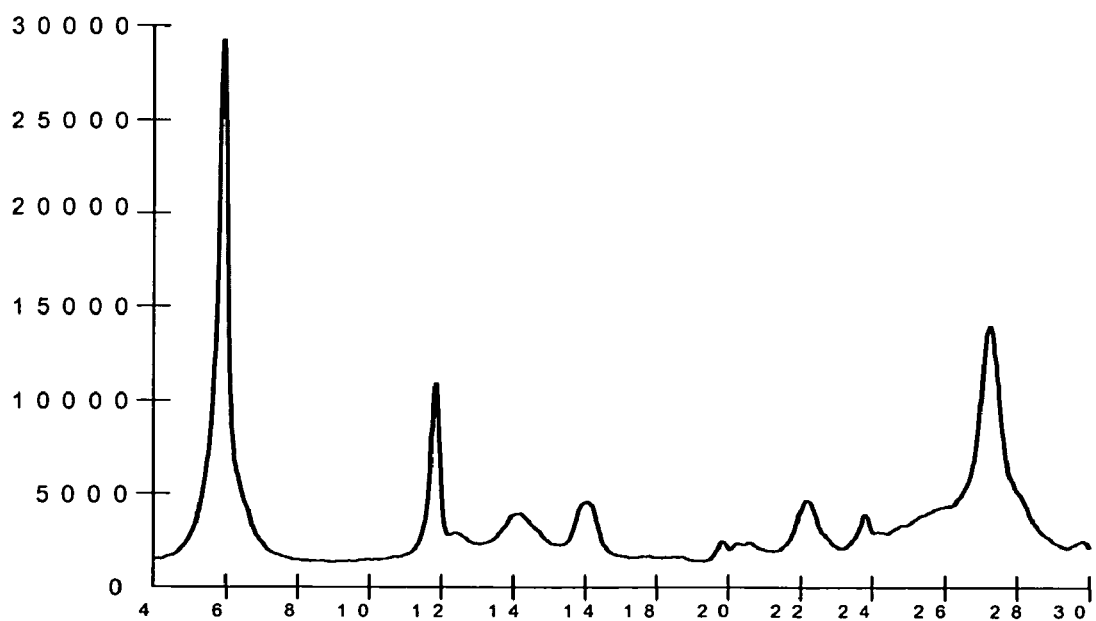
Figure 20. X-ray of Comparison example 3.

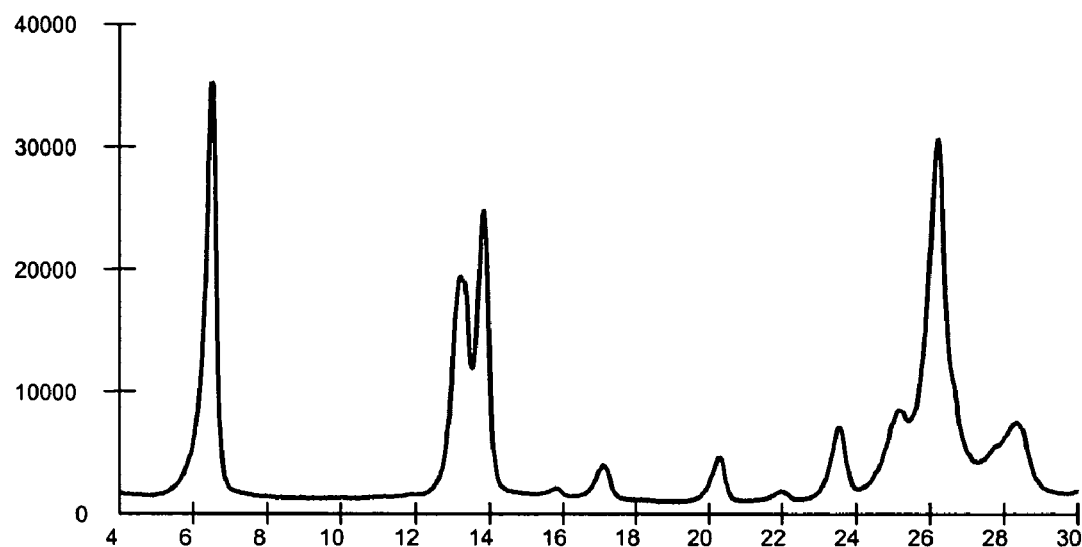
Figure 21. X-ray of unmilled gamma-quinacridone.
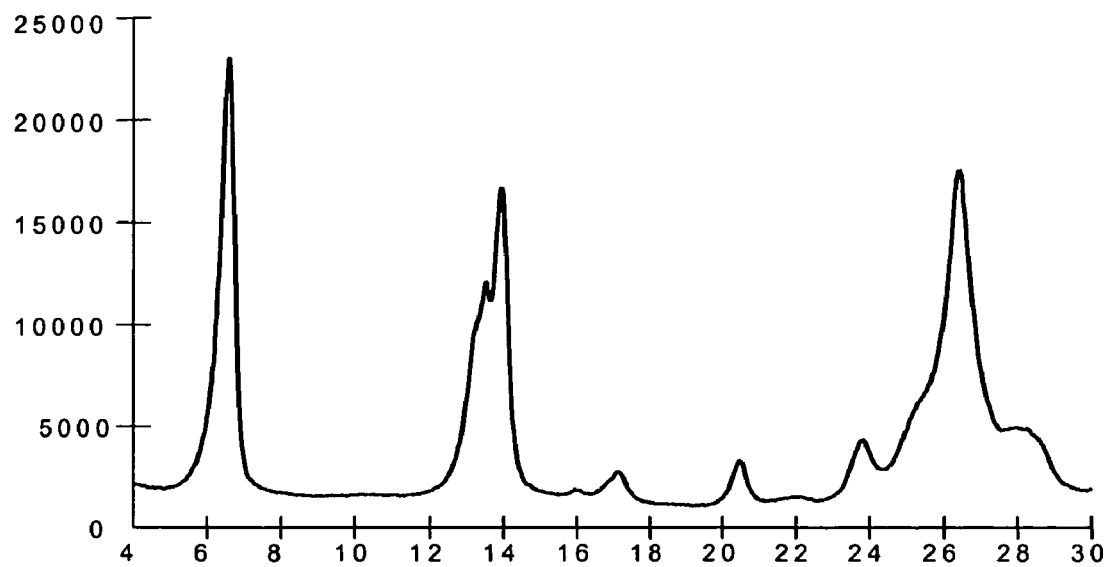
Figure 22. X-ray of wet-milled gamma crude for 12 minutes.

2,9-DICHLORO-QUINACRIDONE AS α-QUINACRIDONE CRYSTAL PHASE INHIBITOR

This application is a continuation in part of U.S. Ser. No. 10/988,227, filed on Nov. 12, 2004, now a granted patent, U.S. Pat. No. 7,101,428, which is a continuation-in-part of U.S. Serial No. 10/988,250, filed on Nov. 12, 2004, now granted U.S. Patent No. 7,122,081 which claims the benefit of U.S. Provisional Application No. 60/519,842, filed Nov. 13, 2003 herein entirely incorporated by reference.

SUMMARY OF INVENTION

The invention is directed to a method or use of 2,9-dichloro-quinacridone as a crystal phase director during the beta-quinacridone or gamma-quinacridone crude pigment particle size reduction process. The invention is also directed to the method and use of 2,9-dichloroquinacridone and 4,11-dichloroquinacridone during the gamma- and/or beta-quinacridone crude pigment particle size reduction process.

BACKGROUND OF THE INVENTION

Quinacridone (QA) is known to exist in three crystal phases. The alpha phase, described in U.S. Pat. No. 2,844,484 and gamma phase described in U.S. Pat. Nos. 2,844,581 and 2,969,366 forms are a bluish red color. The beta form described in U.S. Pat. Nos. 2,844,485 and 4,857,646 is violet. The alpha quinacridone crystal form is not commercially valuable because it is not heat stable. See W. Herbst and K. Hunger, "Industrial Organic Pigments", VCH Publishers, Inc., 1997, page 464.

It is well known in the art that organic pigments, such as quinacridones, as synthesized, are generally unsuitable for use as pigments and must be further processed to develop the requisite pigmentary properties such as particle size, particle shape, polymorphic phase, and tinctorial strength.

In order to obtain the color properties required for a particular application, the pigment crude must be converted to a pigmentary grade with a proper tint strength, transparency or opacity for a particular application. The effectiveness of a given pigment type in imparting color is dependent upon its particle size in dispersion. Thus, color strength, transparency and opacity are all properties that are highly dependent on particle size. Consequently, crude organic pigments undergo one or more finishing or conditioning steps that require particle size reduction. See, for example R. B. McKay, "Control of the Application Performance of Classical Organic Pigments" in JOCCA, 89-93.

Thus, the crude beta- or gamma-quinacridone usually undergoes a particle size reduction process. During this particle reduction of the beta or gamma quinacridone, the beta or gamma quinacridone may convert to the alpha crystal form depending on the milling conditions without a crystal phase director. As mixing of the alpha-quinacridone with either the beta or gamma phase changes product color shade and decreases heat stability of the final finished pigment, inhibition of this conversion during milling is to be avoided.

EP 517662 and U.S. Pat. No. 5,281,269 describe an aqueous milling process of modifying beta-quinacridone with base and phase-transfer catalyst.

EP 1020497 describes the color property of the mixed crystal phase pigment with 2,9-dichloroquinacridone.

EP 799863 describes the preparation of beta-phase quinacridone by conversion of alpha-phase quinacridone.

EP 517663 and EP 517662 describe a process of preparing magenta color beta-1 form quinacridone pigment by either dry milling of beta-quinacridone crude, or milling of beta-quinacridone crude in the presence of water and alcohol.

EP 305328 describes a new magenta color beta-quinacridone that has average particle size over 0.1 microns.

U.S. Pat. No. 3,160,510, discloses solutions of various solid solutions of 2,9-dichloroquinacridone or 4,11-dichloroquinacridone.

U.S. Pat. No. 4,064,129, Harmon Colors, is directed to a process for preparing quinacridones.

U.S. Pat. No. 4,099,980, is directed to a method of producing solid solutions of gamma quinacridone and 4,11-disubstituted quinacridones.

However, none of the above references disclose the use of 2,9-dichloroquinacridone as an alpha-quinacridone crystal phase inhibitor in beta or gamma quinacridone particle size reduction process. None of the above references disclose the use of 4,11 dichloroquinacridone in combination with 2,9-dichloroquinacridone during the particle size reduction process. Surprisingly, it has been discovered that the incorporation of 4,11-dichloroquinacridone with the 2,9-dichloroquinacridone not only inhibits alpha crystal phase formation but the formed milled product shows increased heat stability properties.

The beta-quinacridone crystal phase can be preserved during particle size reduction by the addition of 2,9-dichloroquinacridone during the finishing process. The beta-quinacridone product obtained from this process has blue shade violet color that is not achievable when alpha-quinacridone exists in the product.

Furthermore, it has also been discovered that the same crystal phase inhibitor, 2,9-dichloroquinacridone can also be used with the gamma-quinacridone during the particle size reduction to prevent the formation of alpha-quinacridone. Gamma-quinacridone has red color that can be shifted to yellow or blue shade. Particle size reduction of the gamma shifts the color to a bluer shade without alpha-quinacridone. Beta-quinacridone develops violet color as particle size is reduced. Without alpha-quinacridone, the beta shifts to a bluer violet shade. Thus, a saturated violet color product for beta and red color for gamma is produced with better pigment properties for coatings, plastics and ink applications is achieved for both beta-quinacridone and gamma-quinacridone by milling in the presence of 2,9-dichloroquinacridone as an alpha crystal phase inhibitor.

The addition of 4,11-dichloroquinacridone to the 2,9 dichloroquinacridone during the particle size reduction of gamma quinacridone helps to increase the stability of the final product while retaining the red color of the gamma quinacridone.

SUMMARY OF THE INVENTION

The process of the invention is a process of reducing the particle size of crude quinacridone pigment wherein the pigment is in a beta or gamma crystal phase, while maintaining the beta or gamma crystal phase comprising the steps of combining a milling composition comprising 2,9-dichloroquinacridone and optionally 4,11-dichloroquinacridone with the crude quinacridone, wherein the 2,9-dichloroquinacridone added to the crude pigment is about 0.1% to about 10 weight % based on the dry weight of the crude pigment, and milling to reduce the particle size of the crude pigment.

A second embodiment of the invention encompasses a process of reducing the particle size of a crude quinacridone pigment, wherein the pigment is in the beta or gamma crystal phase, while preventing the crystal phase from converting to an alpha phase comprising the steps of combining 2,9-dichloroquinacridone and optionally 4,11-dichloroquinacridone with the crude quinacridone pigment, wherein the weight % of the 2,9-dichloroquinacridone is about 0.1 to about 10 weight % based on the dry weight of the crude pigment and milling to reduce the particle size of the pigment.

The desired pigmentary particle size for the purposes of the invention will vary depending upon the final application. Pigment primary particle size distribution is generally reduced to about 30-300 nm depending on the milling time and size of milling media. Preferably the pigment primary particle size distribution is reduced to about 40-200 nm. Optionally, a re-growth process may be followed in order to achieve the opacity needed for a particular application. The products obtained from this invention process can be transparent, semi-transparent or opaque.

The 2,9-dichloroquinacridone may be a crude pigment or a finished pigment.

The 4,11-dichloroquinacridone may be a crude or a finished pigment.

The structure of 2,9-dichloroquinacridone used in this invention is described in formula (A).

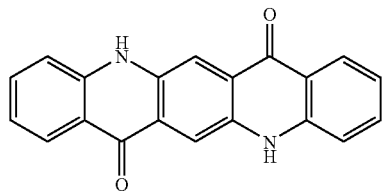

(A), or salt thereof

The structure of 4,11-dichloroquinacridone used in this invention is described in formula (C).

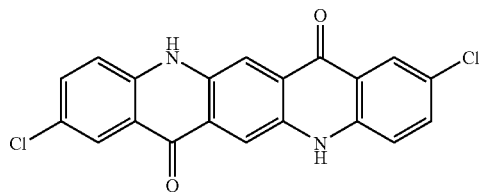

(C) or salt thereof

Beta-quinacridone or gamma-quinacridone crude pigment used in this invention is an unsubstituted quinacridone pigment in the beta or gamma crystal phase as described in formula B.

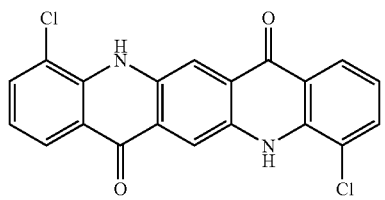

(B), or salt thereof

BRIEF DESCRIPTION OF THE DRAWINGS

FIG. 1. X-ray of example 1, aqueous wet-milled crude beta-quinacridone without 2,9-dichloroquinacridone.

FIG. 2. X-ray of example 2, aqueous wet-milled crude beta-quinacridone with 2,9-dichloroquinacridone.

FIG. 3. X-ray of example 3, aqueous wet-milled crude beta-quinacridone with 2,9-dichloroquinacridone.

FIG. 4. X-ray of example 4, aqueous wet-milled crude beta-quinacridone with 2,9-dichloroquinacridone.

FIG. 5. X-ray of example 5, aqueous wet-milled crude beta-quinacridone with 2,9-dichloroquinacridone.

FIG. 6. X-ray of aqueous wet-milled beta crude of example 6 with 0.5% 2,9-dichloroquinacridone for 60 minutes.

FIG. 7. X-ray of aqueous wet-milled beta crude of example 7 with 0.5% 2,9-dichloroquinacridone for 120 minutes.

FIG. 8. X-ray of aqueous wet-milled beta crude of example 8 with 1.0% 2,9-dichloroquinacridone for 60 minutes.

FIG. 9. X-ray of aqueous wet-milled beta crude of example 9 with 1.0% 2,9-dichloroquinacridone for 120 minutes.

FIG. 10. X-ray of aqueous wet-milled beta crude of example 10 with 2.0% 2,9-dichloroquinacridone for 60 minutes.

FIG. 11. X-ray of aqueous wet-milled beta crude of example 11 with 2.0% 2,9-dichloroquinacridone for 120 minutes.

FIG. 12. X-ray of dry blended 97% gamma crude, 2% 2,9-dichloroquinacridone and 1% 4,11-dichloroquinacridone.

FIG. 13. X-ray of aqueous wet-milled gamma crude of example 13 with 0.5% 2,9-dichloroquinacridone for 30 minutes.

FIG. 14. X-ray of 4,11-dichloroquinacridone unmilled.
FIG. 15. X-ray of 2,9-dichloroquinacridone unmilled.
FIG. 16. X-ray of pure alpha quinacridone.
FIG. 17. X-ray of pure beta-quinacridone.
FIG. 18. X-ray of Comparison example 1.
FIG. 19. X-ray of Comparison example 2.
FIG. 20. X-ray of Comparison example 3.
FIG. 21. X-ray of unmilled gamma-quinacridone.
FIG. 22. X-ray of wet-milled gamma crude for 12 minutes.

DETAILED DESCRIPTION OF THE INVENTION

The crude beta- or gamma-pigments are generally those lacking in properties required for a colorant because of inferior color development and having a particle diameter size range of about 0.2 to 40 μm, preferably 0.3 to 4 μm, most preferably about 1.0-3.0 μm. Alternatively, in the instant invention, commercially available pigments composed of pigment particles with a particle diameter size range of about 0.3 to 0.5 μm may be used as the raw materials to be milled.

The 2,9-dichloroquinacridone may be a crude pigment or a finished pigment.

The 2,9-dichloroquinacridone may be added to the crude pigment before milling commences or during the milling process. The 2,9-dichloroquinacridone may be added in amounts ranging from about 0.1 to about 10 weight % of the crude pigment. Alternatively, the 2,9-dichloroquinacridone may be added in amounts ranging from about 0.3 weight % to about 7.0 weight %, for example, about 0.5 to about 5.0% and about 0.5 to about 4.0%.

The 4,11-dichloroquinacridone may be a crude or a finished pigment. The 4,11-dichloroquinacridone may be added to the crude pigment before milling commences or during the milling process. The 4,11-dichloroquinacridone may be added in amounts ranging from about 0.1 to about 10 weight % of the crude pigment. Alternatively, the 2,9-dichloroquinacridone may be added in amounts ranging from about 0.3 weight % to about 7.0 weight %, for example, about 0.5 to about 5.0% and about 0.5 to about 4.0%.

Typically the milling composition will include about 80 to about 98 weight % gamma or beta quinacridone combined with about 0.1 to about 10 weight % 2,9-dichloroquinacridone and optionally about 0.1 to about 10 weight % 4,11-dichloroquinacridone. When the 2,9-dichloroquinacridone is combined with the 4,11-dichloroquinacridone and the crude gamma or beta quinacridone, the dry weight ratio of 2,9-dichloroquinacridone to 4,11-dichloroquinacridone will be from about 1:10 to about 10:1, for example, about 1:7 to about 7:1, about 1:5 to about 5:1 and about 1:2 to about 2:1.

During dispersion milling the ratio of 4,11-dichloroquinacridone to 2,9-dichloroquinacridone may range from about 5:1 to about 1:5 or about 3:1 to about 1:1.

During wet-milling the ratio of 4,11-dichloroquinacridone to 2,9-dichloroquinacridone may range from about 5:1 to about 1:5 or about 1:1 to about 1:3.

In milling the gamma quinacridone it is preferred that the gamma quinacridone is milled with both 2,9-dichloroquinacridone and 4,11-dichloroquinacridone.

When the beta or gamma quinacridone is milled with 2,9-dichloroquinacridone and optionally 4,11-dichloroquinacridone a solid solution or mixed crystal is formed.

Solid Solution

A solid solution is defined as a solid, homogeneous mixture of two or more constituents which may vary in composition between certain limits and remain homogeneous. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. Solid solutions are also referred to as mixed crystals.

In contrast to simple physical mixtures wherein the color is usually a direct function of the additive effects of the two or more components, solid solutions give unexpected and unpredictable hues. It is impossible to generalize about the direction or the degree of color shift.

In particular, the unsubstituted quinacridones of formula (B) in beta and gamma crystal phases are especially preferred.

Milling Description

Aqueous milling may be carried out using known wet-milling methods. Although the particular milling apparatus is generally not critical, suitable mills include horizontal mills, for example, Dyno-mill, Eiger mills, Netzsch mills, and Super mills. Additional vertical mills, ball mills, attritors, vibratory mills, and the like containing various grinding media are suitable. Suitable grinding media include salt, sand, glass beads, ceramic beads and alumina, zirconium or metal beads.

Dispersion, Wet-Milling or Dry Milling

The milling composition, that is the milling composition which comprises the crude gamma or beta quinacridone, the 2,9-dichloroquinacridone and optionally the 4,11-dichloroquinacridone, contains water and/or solvent or alternatively a salt (dispersion milling) to aid in the milling of the crude pigment.

Dispersion Milling

Milling may also be carried out by dispersion milling. A commercial dispersion milling process for quinacridone pigments wherein the particle size thereof is reduced is disclosed in U.S. Pat. No. 3,030,370. The process involves milling in the presence of anhydrous aluminum sulfate and in the presence of a crystallizing solvent. The crystallizing solvents are broadly defined as anhydrous organic solvents with boiling ranges high enough to withstand the heat of grinding without volatilization and low enough to permit removal by steam distillation. Suitable solvents include tetrachloroethylene, other hydrocarbons and chlorinated hydrocarbons and lower alkyl esters of $C_2$-$C_{10}$ dibasic carboxylic acids can also be readily utilized as crystallizing solvents in such dispersion milling processes.

Grinding the gamma or beta quinacridone in the absence of solvents tends to convert the products to the least stable phases. The introduction of a solvent alters the equilibrium but the degree of alteration is influenced by the nature and amount of solvent, the nature of the pigment, and the amount of grinding. The solvent may promote the formation of the more stable phases or, as a corollary, to retain the more stable phase if it is the starting material.

In dispersion milling, the particle size of a crude pigment is reduced by grinding it, for example in a roller mill with steel grinding media. This grinding is generally carried out in the presence of four to five times the pigment weight of hydrated aluminum sulfate (alum) or other salt. The pigment in the alum mill powder grows with relative uniformity when the alum is extracted with dilute sulfuric acid. For example, the weight ratio of salt to total pigment in the milling composition is about 6 to about 1, about 5 to about 1, about 4 to about 1 and about 3 to about 1 or about 2 to about 1.

The milling composition for the purposes of the invention means the pigment or pigments with rheology modifiers, texture improving agents, solvent or solvents including water and other organic solvents, dispersion milling solvents such as alkyl esters of $C_2$-$C_{10}$ dibasic carboxylic acids, phase inhibitors, salts (alum) and particle size inhibitors.

Depending on the end use, it can be advantageous to add specific amounts of texture improving agents to the pigment. Suitable texture improving agents are, in particular, fatty acids of not less than 18 carbon atoms, for example stearic or behenic acid or the amides or metal salts thereof, preferably calcium or magnesium salts, as well as plasticizers, waxes, resin acids such as abietic acid or metal salts thereof, colophonium, alkyl phenols or aliphatic alcohols such as stearyl alcohol or vicinal diols such as dodecane-1,2-diol, and also modified colophonium/-maleate resins or fumaric acid/colophonium resins or polymeric dispersants. The texture improving agents are preferably added in amount of 0.1 to 30%, by weight, most preferably 2 to 15% by weight, based on the final product.

Particle growth inhibitors may be for example, phthalimidomethyl-, imidazolylmethyl- and pyrazolylmethyl-quinacridone; phthalimidomethyl- and o-benzosulfimidomethyl-6,13-dihydroquinacridone; and quinacridone monosulfonic acid and 1,4-diketo-3,6-diarylpyrrolo[3,4-c]pyrrole sulfonic acid and their salts.

Rheology improving agents are known in the art and include pyrazolylmethyl-substituted quinacridones, pyrazolylmethyl-substituted-1,4-diketo-3,6-diaryl-pyrrolo[3,4-c]pyrroles, quinacridone sulfonic acids and/or their salts, 1,4-diketo-3,6-diaryl-pyrrolo[3,4-c]pyrrole sulfonic acids and/or their salts, N,N-dialkylquinacridonesulfonamides, phthalimidomethylquinacridones, phthalimidomethyl-1,4-diketo-3,6-diaryl-pyrrolo[3,4-c]-pyrroles and mixtures thereof. Suitable rheology improving agents include pyrazolylmethyl-quinacridone, aluminum quinacridone monosulfonate and mixtures thereof.

In general, the present pigment compositions contain from 0 to 10% by weight of the rheology improving agent, based on the weight of the pigment composition. Preferably, the pigment compositions contain from 2 to 6% by weight of the rheology improving agent. Especially preferred pigment compositions contain from 3 to 5% by weight of the rheology improving agent.

The applicable dispersion solvents are dialkyl esters of dibasic carboxylic acids such as those disclosed in U.S. Pat. No. 5,084,100 herein incorporated entirely by reference.

Preferred alkyl esters are $C_1$-$C_4$ alkyl and most preferably methyl. Typical acid esters are malonates, succinates, glutarates and adipates, with succinates and glutarates being particularly preferred. Dimethyl glutarate is the preferred solvent.

Surprisingly, it has also been discovered that the incorporation of relatively low amounts (0.1 to about 10 wt. % of the total dry pigment) of 4,11-dichloroquinacridone in the milling composition (with the 2,9-dichloroquinacridone) gives a three component solid solution which is more heat stable than the two component solid solution of 4,11-dichloroquinacridone with the beta or gamma quinacridone formed in the same milling process.

Wet Milling

Suitable milling liquid for wet-milling is water, and can include less than 5 wt. % of polar organic solvent, such as dimethylformamide, dimethylacetamide, dimethylsulfoxide, lower aliphatic alcohols such as methanol, ethers including tetrahydrofuran and dioxane, and alkylene glycols and triols such as ethylene glycol and glycerol.

The wet-milling liquid is made up of greater than about 10 wt. % water, preferably greater than about 20 wt. % water, and most preferably greater than 30 wt. % water. For example, water makes up about 5 wt. % to about 98 wt. % or 5 wt. % to about 95 wt. % based on the total milling composition.

For water, solvent milling or dispersion milling the crude beta or gamma quinacridone will make up from about 1 wt. % to about 95 wt. %, 1 wt. % to about 85 wt. %, 1 wt. % to about 80 wt. %, 2 wt. % to about 85 wt. %, 2 wt. % to about 78 wt. %, or 2 wt. % to about 75 wt. % of the total milling composition. Thus the crude quinacridone makes up about 2 wt. % to about 95 wt. %, 5 wt. % to about 95 wt. %, for example about 5 wt. % to about 30 wt. % or about 2 wt. % to about 20 wt. % of the total weight of the milling composition.

Defoamers can be used optionally in the inventive wet-milling process. The defoamer may be added before and/or during milling for foam control.

Dispersing agents or polymeric grinding aids for wet-milling may be styrenic resins such as those described in U.S. application Ser. No. 10/988,250 or acrylic resins such as those described in U.S. Pat. No. 6,410,619.

Milling temperature depends on the size of the mill, and the quantity of crude pigment being milled but is generally carried out at a temperature of 20° C. to about 95° C. Preferably the process milling temperature is 30° C. to about 90° C. Optionally, cooling with water may control the temperature.

In the instant invention, the average particle diameter of the resulting milled pigments are about 30-300 nm, preferably 40-200 nm.

Particle size reduction time for either the beta-quinacridone or gamma-quinacridone in the presence of the crystal phase inhibitor, 2,9-dichloroquinacridone may vary from thirty minutes to forty-eight hours depending upon the particle size needed for a particular application and the particular crude pigment being wet-milled or dispersion milled.

Grinding media for wet-milling is generally loaded to about 75%-85% of chamber space. The milling media, consists of beads composed of materials such as zirconium oxide, glass, borosilicate, metal, alumina and polymeric beads for example, those described in U.S. Pat. Nos. 5,902,711, and 5,478,705.

Grinding media for dispersion milling is generally steel shot, iron nails and spikes, or ceramic beads. Dispersion milling cycles generally range from about 2 to about 48 hours. The amount of solvent is chosen such that the desired crystal phase is maintained, while allowing the desired particle size to be generated in a reasonable mill time. Amounts ranging from 2 to 15%, by weight of quinacridone, and preferably 4 to 13%, are generally utilized.

The milling may take place at a pH that ranges from about 4.0 to about 12.0. The pH is preferably about 6 to about 9.

The dispersion-milling may be carried out in an appropriate crystallizing solvent. The crystallizing solvents are broadly defined as anhydrous organic solvents with boiling ranges high enough to withstand the heat of grinding without volatilization and low enough to permit removal by steam distillation. Suitable solvents include tetrachloroethylene, other hydrocarbons and chlorinated hydrocarbons and lower alkyl esters of $C_2$-$C_{10}$ dibasic carboxylic acids can also be readily utilized as crystallizing solvents in such dispersion milling processes.

Colored additives, such as organic pigment derivatives, or uncoloured additives, such as polymers, can also optionally be added to the milling mixture during the milling process.

After milling, the pigment may be separated from the milling mixture by one or more isolation methods known in the art. Filtration, followed by washing to remove residual salts and solvent, is the preferred separation method. Other collection methods known in the art, such as tray drying, spray drying, spin flash drying, lyophilization, centrifugation, or simple decantation are also suitable isolation methods. Such methods can be used individually or in combination.

The present reduced size gamma and/or beta quinacridone pigments are suitable as coloring matter for inorganic or organic substrates. They are highly suitable for coloring high molecular weight materials, which can be processed to cast and molded articles or which are used in ink and coating compositions such as solvent or water based coatings, for example in automotive coatings. Preferred high molecular weight materials are plastics that are subsequently calendered, cast, molded or processed to fibers and industrial or automotive paints or ink coatings.

For the purposes of the invention, high molecular weight material is defined as material in the range of about $10^3$ to about $10^8$ g/mol. Molecular weight for the purposes of the invention means average molecular weight.

Suitable high molecular weight organic materials include thermoplastics, thermoset plastics or elastomers, for example, cellulose ethers; cellulose esters such as ethyl cellulose; linear or crosslinked polyurethanes; linear, crosslinked or unsaturated polyesters; polycarbonates; polyolefins such as polyethylene, polypropylene, polybutylene or poly-4-methylpent-1-ene; polystyrene; polysulfones; polyamides; polycycloamides; polyimides; polyethers; polyether ketones such as polyphenylene oxides; and also poly-p-xylene; polyvinyl halides such as polyvinyl chloride, polyvinylidene chloride, polyvinylidene fluoride or polytetrafluoroethylene; acrylic and methacrylic polymers such as polyacrylates, polymethacrylates or polyacrylonitrile; rubber; silicone polymers; phenol/formaldehyde resins; melamine/formaldehyde resins; urea/formaldehyde resins; epoxy resins; diene rubbers or copolymers thereof such as styrene butadiene rubber; acrylonitrile-butadiene rubber or chloroprene rubber; singly or in mixtures.

Generally, the present reduced size gamma and/or beta quinacridone pigments are used in an effective pigmenting amount, for example, of 0.01 to 30% by weight, preferably 0.1 to 10% by weight, based on the weight of the high molecular weight organic material to be pigmented. Thus, the present invention also relates to a pigmented plastic composition, which comprises a plastic material and an effective pigmenting amount of a pigment or pigment solid solution prepared according to a process of the present invention, and to a process for preparing said pigmented plastic compositions.

The present reduced size gamma and/or beta quinacridone pigments are easily dispersible and can be readily incorporated into organic matrixes to provide homogenous colorations possessing high saturation.

The high molecular weight organic materials are pigmented with the present reduced size gamma and/or beta quinacridone pigments by mixing the pigments, if desired in the form of a masterbatch, into substrates using high shear techniques including roll mills or a mixing or grinding apparatus. The pigmented material is then brought into the desired final form by known methods, such as calandering, pressing, extruding, brushing, casting or injection molding.

EXAMPLES

General Wet-milling Procedure

The aqueous particle size reduction process (wet-milling) for the crude beta-quinacridone is performed using circulation milling media, such as zirconium oxide beads in a Netzsch-mill and Dyno-mill, in a size range of about 0.2-1.2 mm diameter with a loading of about 75 to about 90% of milling chamber space. Other than water, the milling slurry has a composition of about 5 to about 45% organic pigment or mixture of pigments based on the total weight of the slurry. Optionally, the milling media may have about 0.5 to about 20% pigment derivative additives, based on the dry weight of the pigment, non-pigment additives including polymeric dispersants or mixtures of additives. Particle size reduction time may vary from about ten minutes to about forty-eight hours in order to achieve the particle size needed for the application. Milled product may be isolated after particle size reduction process, or the crystal size can be re-grown by heating the aqueous slurry to about 70 to about 95° C. with addition of base, polar organic solvent and/or amine salt.

General Dispersion Milling Procedure

The dispersion milling process for the crude gamma or beta-quinacridone is preformed by charging a commercial ball mill with "Cyl-Pebs®" (approximately 2.5 cm sections of 1.6 cm diameter steel rod) and railroad spikes along with commercial aluminum sulfate and a crystallizing solvent. In the present example the crystallizing solvent is dimethyl glutarate.

The crude gamma or beta-quinacridone is then charged into the ball mill. The charge is ground by rotating the mill for about 2 to about 48 hours. The contents of the mill are then discharged through a screen which retains the "Cyl-Pebs®" and railroad spikes.

Extraction after Dispersion Milling of Beta or Gamma-quinacridone.

A suitable vessel is charged with 1.5% sulfuric acid and the milled content above. The mixture is heated to about 90° C. The pigmentary solution of gamma-quinacridone is isolated in a suitable filtration device and washed free of acid and salts. The resulting water wet pigment may be either dried or further treated depending on the desired end use.

Color data is obtained using CM-3600d spectrophotometer manufactured by Minolta Corporation USA. 101 Williams Drive, Ramsey, N.J.

C.I.E. L.A.B. color space values (L*, a*, b*, C*, h*) using a D65 illuminant and 10 degree observer with a specular component included:

Beta-Quinacridone

Example 1

Crude beta-quinacridone Aqueous Milling with phthalimidomethyl quinacridone, without 2,9-dichloroquinacridone To a 5000 ml circulation flask is added 200.0 g of dry beta-quinacridone crude, 32.0 g of polymeric dispersant Scripset 720 (25% maleic acid acrylic acid copolymer in water) manufactured by Hercules incorporated, Wilmington, Del., 8.0 g phthalimidomethyl quinacridone, and 500.0 g of water. Above chemicals are mixed with a mechanic stirrer for 30 minutes. The resulting slurry is milled in a Netzsch Mill in a pH range of 7.0-9.0.

The Netzsch Mill grinding chamber is filled with 1825.0 g (500 ml) of 0.3 mm $ZrO_2/Y_2O_3$ beads and 367.0 g of water. Prepared pigment slurry is pumped into the Netzsch Mill, milling is started at flow rate of 400.0 g/minute, tip speed set up at 12.0 meter/second (m/s), and milling temperature is controlled in a range of 50-55° C. Total milling time is 120 minutes. Milled beta-quinacridone slurry is diluted with 500.0 g of water, slurry pH is adjusted to 5.0 with 2% $H_2SO_4$, then filtered and washed with hot water until pH 7.0, dried in an oven at 80° C. The isolated product is submitted for screening in alkyd melamine paint. X-ray of the milled product shows a peak at 140 corresponding to alpha-quinacridone. Color data of beta-quinacridone crude and the milled product is listed in Table 4. X-ray of the milled crude beta-quinacridone without 2,9-dichloroquinacridone product is shown FIG. 1.

Example 2

Crude beta-quinacridone Aqueous Milling with phthalimidomethyl quinacridone and 2,9-dichloroquinacridone To a 5000 ml circulation flask is added 171.5 g of dry beta-quinacridone crude, 3.5 g of phthalimidomethyl quinacridone, 3.5 g of 2,9-dichloroquinacridone, and 1951.5 g of water. Above chemicals are mixed with a mechanic stirrer for 30 minutes. The resulting slurry is milled in a Netzsch Mill in a pH range of 7.0-9.0.

The Netzsch Mill grinding chamber is filled with 1825.0 g (500 ml) of 0.3 mm $ZrO_2/Y_2O_3$ beads and 370.0 g of water. Prepared pigment slurry is pumped into the Netzsch Mill, milling is started at flow rate of 800.0 g/minute, tip speed set up at 12.0 m/s, and milling temperature is controlled in a range of 80-85° C. Total milling time is 102 minutes. 500.0 g of milled beta-quinacridone slurry is diluted with 500.0 g of water, then filtered and washed with hot water till pH 7.0, dried in an oven at 80° C. The isolated product is submitted for screening in alkyd melamine paint. X-ray of the milled product shows no peak at 14θ, which indicates no alpha-quinacridone. Color data of the milled product is listed in Table 4. X-ray of the milled product is shown in FIG. 2.

Example 3

Crude beta-quinacridone Aqueous Milling with 2,9-dichloroquinacridone

To a 5000 ml circulation flask is added 171.5 g of dry beta-quinacridone crude, 3.5 g of 2,9-dichloroquinacridone 14.0 g of Staybelite Ester®, a polymeric dispersant 10-55WK (55% active aqueous dispersion of the glycerol ester of hydrogenated rosin mixture, manufactured by Eastman Chemical Resins, Kingsport, Tenn.), and 1955.0 g of water. Above chemicals are mixed with a mechanic stirrer for 30 minutes. The resulting slurry is milled in a Netzsch Mill in a pH range of 7.0-9.0.

The Netzsch Mill grinding chamber is filled with 1825.0 g (500 ml) of 0.3 mm $ZrO_2/Y_2O_3$ beads and 370.0 g of water. Prepared pigment slurry is pumped into the Netzsch Mill. Milling is started at flow rate of 800.0 g/minute, tip speed set up at 12.0 m/s, and milling temperature is controlled in a range of 80-85° C. Total milling time is 60 minutes. 300.0 g of milled beta-quinacridone slurry is diluted with 500.0 g of water, then filtered and washed with hot water till pH 7.0, dried in 80° C. oven overnight. The isolated product is submitted for screening in alkyd melamine paint. X-ray of the milled product shows no peak at 14θ, which indicates no alpha-quinacridone. Color data of the milled product is listed in Table 4. X-ray of the milled product is shown in FIG. 3.

Example 4

Crude beta-quinacridone Aqueous Milling with 2,9-dichloroquinacridone.

Example 3 is repeated except; milling time is 90 minutes. The isolated product is submitted for screening in alkyl melamine paint. X-ray of the milled product shows no peak at 14θ, which indicates no alpha-quinacridone. Color data of the milled product is listed in Table 4. X-ray of the milled product is shown in FIG. 4.

Example 5

Crude beta-quinacridone Aqueous Milling with 2,9-dichloroquinacridone.

Example 3 is repeated except; milling time is 120 minutes. The isolated product is submitted for screening in alkyd melamine paint. X-ray of the milled product shows no peak at 14θ, which indicates no alpha-quinacridone. Color data of the milled product is listed in Table 4. X-ray of the milled product is shown in FIG. 5.

Example 6-11

Example 3 is repeated for examples 6-11 except; milling time is varied, amount of 2,9-dichloroquinacridone is also varied and no Staybelite Ester® is added. See FIGS. 6-11. X-rays of the milled products shows no peak at 14θ. Thus 2,9-dichloroquinacridone functions as an alpha phase inhibitor at varying dosage levels and varying milling times. See Table 5 for color data and FIG. 11, X-ray data for example 11.

TABLE 1

| Example (beta-crude Milling) | Milling time in minutes | 2,9-dichloroquinacridone in wt. % | Method of Milling |
| --- | --- | --- | --- |
| 6 | 60 | 0.5 | Wet-milling |
| 7 | 120 | 0.5 | Wet-milling |
| 8 | 60 | 1.0 | Wet-milling |
| 9 | 120 | 1.0 | Wet-milling |
| 10 | 60 | 2.0 | Wet-milling |
| 11 | 120 | 2.0 | Wet-milling |

Gamma-Quinacridone

Combination of 2,9-dichloroquinacridone with 4,11-dichloroquinacridone with Gamma unsubstituted Quinacridone Example 12

To a dispersion mill 100 lbs Cylpebs® and 10 lbs of spikes is charged followed by a charge of 1532.2 grams aluminum sulfate (anhydrous), 647.1 grams crude gamma quinacridone, 20.4 grams 4,11-dichloroquinacridone, 13.6 grams 2,9-dichloroquinacridone, and 18.7 grams dimethylglutarate. Grinding continues at 40 rpm for 5 hours.

The mill powder is extracted with sulfuric acid and water (1.5% sulfuric acid) with stirring for 2 hr at 90° C. Water is then added to cool the extraction mixture to about 60 to about 65° C., with filtering and washing to neutral pH. The finished gamma-quinacridone is dried to less than 1% moisture before formulation with alkyl melamine paint and testing to determine color space in Table 6. When crude gamma-quinacridone is dispersion milled with 2,9-dichloroquinacridone, then extracted as above, the gamma phase is preserved.

Example 12A

To a 100-gallon glass-lined reactor with stirring 317 lbs water, 23.4 lbs gamma phase quinacridone, 0.48 lbs 2,9 dichloro quinacridone, 0.24 lbs 4,11 dichloro quinacridone and 0.24 lbs phthalimidomethylquinacridone is added. The mixture is milled in a 100 L Netzsch LMZ100™ horizontal media mill with 0.25 mm steel media filled to 90% mill capacity. Milling is continued to 3.6 kWh energy. After milling the milled composition is ripened for 120 minutes at 80° C. with stirring in 2% sulfuric acid and then quenching with cold water. The mixture is filtered, dried and further milled to a fine powder.

The finished fine powder has advantageous color versus the gamma phase quinacridone without the 2,9-dichloroquinacridone and 4,11-dichloroquinacridone addition. See Table 6.

Example 12B

The milling is carried out as above in example 12A, except, 21.2 lbs gamma phase quinacridone, 2.4 lbs 2,9 dichloro quinacridone, 0.5 lbs 4,11-dichloroquinacridone and 0.24 lbs phthalimidomethylquinacridone are milled.

Example 12C 380 lbs gamma phase quinacridone, 16 lbs 4,11-dichloroquinacridone, 4 lbs 2,9-dichloroquinacridone, 900 lbs. aluminum sulfate, 11 lbs dimethyl glutarate, and 14 lbs dodecyl benzene sulfonic acid, isopropyl amine salt is dispersion milled with steel milling media for about 3.5 hours. The milling mixture is discharged to an extraction tank where 37 gallons concentrated sulfuric acid and 3300 gallons water are charged and heated to 90° C. and held for 2 hours. The mixture is then filtered and is transferred to a laking tank where 100 lbs of sodium salt of abietic acid and 70 lbs calcium chloride are added. The slurry is filtered, washed, tray dried and mircropulverized.

TABLE 2

| Example (gamma-crude milling) | 4,11-dichloro-quinacridone in wt. % | 2,9-dichloro-quinacridone in wt. % | Method of Milling |
|---|---|---|---|
| 12 | 3.2 | 0.5 | Dispersion milling |
| 12A | 1.0 | 2.0 | Wet-milling |
| 12B | 2.3 | 11.3 | Wet-milling |
| 12C | 4.2 | 1.0 | Dispersion milling |

Example 13

Crude gamma-quinacridone Aqueous Milling with 2,9-dichloroquinacridone

Example 3 is repeated in example 13 except no Staybelite Ester® is added and the crude pigment milled is gamma-quinacridone. The crude gamma-quinacridone and 0.5 wt. % 2,9 dichloroquinacridone is added during wet-milling. See FIG. 13 for X-ray data.

Comparison examples are prepared in order to examine X-ray pattern of alpha-quinacridone and beta-quinacridone mixture. Samples are generated by physical mixing the known beta-quinacridone and alpha-quinacridone in a given percentage and X-ray spectra are obtained.

Comparison Example 1

To a 100 mL solid sample bottle is added 0.250 g of alpha-quinacridone obtained from milling process, and 2.0 g of beta-quinacridone crude, alpha-quinacridone and beta-quinacridone weight ratio equals 1.0/8.0. Above sample is placed in a shaker and mixes for 60 minutes before submitting for X-ray. A peak at 14θ is corresponding to alpha-quinacridone. X-ray spectrum is shown in FIG. 18.

Comparison Example 2

To a 100 mL solid sample bottle is added 0.600 g of alpha-quinacridone obtained from milling process, and 2.0 g of beta-quinacridone crude, alpha-quinacridone and beta-quinacridone weight ratio equals 1.0/3.3. Above sample is placed in a shaker and mixes for 60 minutes before submitting for X-ray. A peak at 14θ corresponds to alpha-quinacridone. X-ray spectrum is shown in FIG. 19.

Comparison Example 3

To a 100 mL solid sample bottle is added 1.0 g of alpha-quinacridone obtained from milling process, and 1.0 g of beta-quinacridone crude, alpha-quinacridone and beta-quinacridone weight ratio equals 1/1. Above sample is placed in a shaker and mixes for 60 minutes before submitting for X-ray. A peak at 14θ corresponding to alpha-quinacridone. X-ray spectrum is shown in FIG. 20.

Color of Aqueous Milled Beta-Quinacridone vs. Crude Beta-Quinacridone in Alkyd/Melamine Paint [a]

TABLE 4

| | Tint | | Color | | Masstone | | Color |
|---|---|---|---|---|---|---|---|
| Sample | L | C | H | Str. | L | C | H |
| Crude β-quinacridone | 69.9 | 18.6 | 337.5 | 100.0 | 38.5 | 44.3 | 9.7 |
| Example 1 | 62.0 | 28.5 | 326.7 | 224.9 | 35.0 | 40.5 | 6.2 |
| Example 2 | 61.3 | 27 | 322.2 | 353.9 | 34.3 | 36.8 | 9.0 |
| Example 3 | 62.2 | 25.3 | 324.6 | 354.9 | 34.7 | 37.6 | 9.3 |
| Example 4 | 62.1 | 25.1 | 323.9 | 357.9 | 34.5 | 37.0 | 8.8 |
| Example 5 | 61.7 | 25.4 | 323.3 | 357.9 | 34.4 | 36.6 | 8.8 |

TABLE 5

| | Tint | | Color | | Masstone | | Color | |
|---|---|---|---|---|---|---|---|---|
| Sample | L | C | H | Str. | L | C | H | Trans. |
| Commercial β-quinacridone | 60.4 | 28.5 | 321.9 | 100.0 | 33.6 | 34.2 | 8.9 | STD |
| Example 6 | 61.4 | 27.0 | 326.7 | 92.0 | 35.6 | 36.2 | 9.1 | −7.3 |
| Example 7 | 61.6 | 25.9 | 324.9 | 90.0 | 35.2 | 37.0 | 8.6 | −6.5 |
| Example 8 | 61.4 | 27.3 | 325.4 | 94.0 | 35.4 | 37.9 | 8.3 | −5.6 |
| Example 9 | 61.6 | 26.5 | 323.9 | 92.0 | 35.1 | 37.2 | 7.8 | −4.9 |
| Example 10 | 61.2 | 27.6 | 325.6 | 94.0 | 35.3 | 38.1.6 | 8.7 | −5.4 |
| Example 11 | 61.3 | 26.4 | 323.3 | 93.0 | 34.8 | 36.6 | 8.4 | −4.4 |

Color of Aqueous Milled gamma-quinacridone vs. Standard gamma-quinacridone in Alkyd/Melamine Paint [a]. The commercial gamma-quinacridone is gamma-quinacridone dispersion milled with 3 to 6 wt. % 4,11-dichloroquinacridone.

TABLE 6

| | Tint | | Color | | Masstone | | Color | |
|---|---|---|---|---|---|---|---|---|
| Example | L | C | H | Str. | L | C | H | Trans. |
| Commercial gamma Red | 62.5 | 46.2 | 352.9 | 100.0 | 41.2 | 53.0 | 21.8 | STD |
| Example 12 (dispersion milling and extraction) | 62.6 | 45.5 | 353.1 | 99 | 41.8 | 54.5 | 22.0 | −0.8 |
| Example 12A | 63.4 | 45.9 | 352.5 | 121.8 | 41.9 | 55.8 | 22.9 | −2.8 |

Color of Dispersion Milled gamma-quinacridone vs. Standard gamma-quinacridone in PVC plastic[b]

TABLE 7

| | Color Data in PVC Plastic[b] | | | | | | |
|---|---|---|---|---|---|---|---|
| | Tint | | Color | | Masstone | | Color |
| Example | L | C | H | Str. | L | C | h |
| Commercial gamma Red | 63.2 | 43.5 | −6.4 | 100.0 | 40.6 | 48.9 | 19.3 |
| Example 12C (dispersion milling and extraction) | 65.8 | 43.2 | −4.5 | 105 | 40.7 | 49.1 | 19.4 | a. Alkyl Melamine Paint Formulation:

Mill base:

To a 8 oz jar is added 1.2 g of pigment sample, 0.6 g of DISPERBYK 161 (high molecular weight block co-polymer dispersing additive, 30% active), 56.2 g of alkyd melamine resin, 100 g glass beads (Ø2 mm). Above mixture is placed in a Skandex and milled for 2 hours. Pigment slurry is separated form glass beads, and collected as mill base. Pigment percentage is 2.1%.

Masstone Color:

7.5 g of above mill base is diluted with 22.5 g of alkyd melamine resin, the pigment dispersion is drawn down on a Black/White Carton with 100 μm wet film wired bar coater (No. 8) with the KCC automatic film applicator, dried 30 minutes @130° C.

Tint Color:

16.7 g of above mill base is diluted with 15.0 g of white paint (20% TiO$_2$), the pigment dispersion is drawn down on a White Card with 100 μm wet film wired bar coater (No. 8) with the KCC automatic film applicator, dried 30 minutes@130° C.

b. PVC Plastic 63.0 grams of polyvinyl chloride, 3.0 grams epoxidized soybean oil, 2.0 grams of barium/cadmium heat stabilizer, 32.0 grams dioctyl phthalate and 1.0 gram of the pigment are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2, by constant folding, removal and feeding. The resulting soft PVC sheet is colored in an attractive highly saturated, red shade and has excellent fastness to heat, light and migration.

Heat Stability in HDPE

Comparison of Example 12C with Commercial Gamma Quinacridone grams of the pigment composition prepared according to Example 12C, 2.5 grams hindered amine light stabilizer, 1.0 gram benzotriazole UV absorber, 1.0 gram hindered phenol antioxidant and 1.0 gram phosphite process stabilizer are mixed together with 1000 grams of high density polyethylene at a speed of 175-200 rpm for 30 seconds after flux. The fluxed pigmented resin is chopped up while warm and malleable, and then fed through a granulator. The resulting granules are molded on an injection molder with a 5 minute dwell time and a 30 second cycle time at temperatures of 200, 240, 260, 280 and 300° C. Homogeneously colored chips which show a similar red color is obtained at each of the temperature steps, demonstrating the excellent heat stability of the pigment composition.

5 grams of the commercial gamma quinacridone composition was also prepared as above and directly compared for heat stability in HDPE with the 3 component pigment of example 12C. See Tables 8 and 9.

TABLE 8

| | Commercial Gamma Quinacridone | | | | | | | |
|---|---|---|---|---|---|---|---|---|
| ° C. | Str. | L* | A* | b* | C* | h* | DC* | dE* |
| 200 | 100 | 63.39 | 46.1 | −5.77 | 46.46 | 352.9 | | |
| 240 | 97 | 63.56 | 45.4 | −5.37 | 45.71 | 353.29 | −0.75 | 0.83 |
| 260 | 94 | 63.69 | 44.57 | −5.77 | 44.95 | 352.66 | −1.52 | 1.56 |
| 280 | 87 | 63.89 | 42.63 | −6.46 | 43.11 | 351.42 | −3.35 | 3.58 |
| 300 | 84 | 63.17 | 38.99 | −7.87 | 39.77 | 348.65 | −6.69 | 7.42 |

TABLE 9

| | Example 12C | | | | | | | |
|---|---|---|---|---|---|---|---|---|
| ° C. | Str. | L* | a* | b* | C* | h* | DC* | dE* |
| 200 | 100 | 62.73 | 46.65 | −6.08 | 46.05 | 352.45 | | |
| 240 | 94 | 63.24 | 44.82 | −5.65 | 45.17 | 352.85 | −0.88 | 1.07 |
| 260 | 93 | 63.31 | 44.48 | −5.9 | 44.87 | 352.49 | −1.18 | 1.32 |
| 280 | 88 | 63.28 | 42.79 | −6.93 | 43.35 | 350.84 | −2.7 | 3.03 |
| 300 | 87 | 62.5 | 40.24 | −8.09 | 41.04 | 348.68 | −5.01 | 5.78 |

We claim:

1. A process of reducing the particle size of a crude quinacridone pigment wherein the pigment is in a beta or gamma crystal phase, while maintaining the said beta or gamma crystal phase comprising the steps of
combining a milling composition comprising 2,9-dichloroquinacridone with the crude quinacridone pigment and
optionally, 4,11-dichloroquinacridone,
wherein the wt. % of the 2,9-dichloroquinacridone is about 0.1 % to about 10 weight % based on the dry weight of the crude pigment, and
milling to reduce the particle size of said pigment.

2. A process according to claim 1, wherein the crude pigment crystal phase is beta.

3. A process according to claim 1, wherein the crude pigment is wet-milled or dispersion milled.

4. A process according to claim 2, wherein the crude beta pigment is wet-milled or dispersion milled.

5. A process according to claim 1, wherein the crude pigment has a particle size range of about 0.2 μm to about 4.0 μm.

6. A process according to claim 1, wherein the particle size after milling is about 30 nm to about 300 nm.

7. A process according to claim 1, wherein the crude pigment is milled in the presence of one or more other additives selected from the group consisting of modification reagents, rheology improving agents, texture improving agents, defoamers, wetting agents, particle growth inhibitors, crystal phase directors, antiflocculants, polymeric milling aids and dispersants.

8. The process according to claim 1 wherein the crude quinacridone is about 1 wt. % to about 95 wt. % based on the total weight of the milling composition.

9. A process according to claim 8 wherein the crude quinacridone is about 2 wt % to about 85 wt. % based on the total weight of the milling composition.

10. A process according to claim 1, wherein the milling composition contains water.

11. A process according to claim 10, wherein the water makes up about 5 wt. % to about 98 wt. % based on the total milling composition.

12. A process according to claim 11, wherein the water makes up about 60 wt.% to about 95 wt. % based on the total milling composition.

13. A process according to claim 1, wherein the crude quinacridone makes up about 2 wt. % to about 85 wt. % of the total weight of the milling composition.

14. A process according to claim 13, wherein the gamma or beta crude quinacridone makes up about 2 wt. % to about 78 wt. % of the total milling composition.

15. A process according to claim 1, wherein the process further includes at least one of the steps selected from the group consisting of isolation, crystal re-growth and surface treatment.

16. The process according to claim 2, wherein the 2,9 dichloroquinacridone is 0.1 to about 5.0 wt. % based on the dry weight of the crude pigment.

17. A high molecular weight organic material having incorporated therein the reduced size quinacridone according to the process of claim 1, wherein the high molecular weight material is defined as material in the range of $10^3$ to $10^8$ g/mol.

18. A material according to claim 17, wherein the material is an ink, coating or plastic.

19. A process for coloring a high molecular weight organic material, which comprises incorporating an effective pigmenting amount of the reduced size quinacridone obtained according to the process of claim 1 into a high molecular weight organic material and the high molecular weight organic material is defined as material in the range of $10^3$ to $10^8$ g/mol.

20. A process of reducing the particle size of a crude quinacridone pigment, wherein the pigment is in a gamma crystal phase, while preventing the gamma crystal phase from converting to the alpha phase comprising the steps of
    combining a milling composition comprising 2,9-dichloroquinacridone and optionally 4,11-dichloroquinacridone with the crude gamma-quinacridone,
    wherein the wt. % of the 2,9-dichloropuinacridone is 0.1 wt. % to about 10.0 wt. % based on the dry weight of the crude pigment and milling to reduce the particle size of said pigment.

21. A process according to claim 20, wherein the crude gamma pigment is dispersion milled.

22. The process according to claim 20, wherein the milling composition comprises about 0.1 to about 7 wt. % 2,9-dichloroquinacridone and about 0.1 to about 10 wt. % 4,11-dichloroquinacridone.

23. The process according to claim 20, wherein the milling composition additionally comprises 4,11-dichloroquinacridone and the 4,11-dichloroquinacridone is 0.1 wt. % to about 10.0 wt. % based on the dry weight of the crude pigment.

24. A pigment composition comprising a solid solution comprising 98 to 80 wt. % gamma quinacridone, 0.1 to 10 wt. % 2,9-dichloroquinacridone and 0.1 to 10 wt. % 4,11-dichloroquinacridone and the wt. % is based on the total dry weight of the solid solution.

25. The pigment composition according to claim 24, wherein the weight ratio of the 2,9-dichloroquinacridone and the 4,11-dichloroquinacridone is about 1:10 to about 10:1.

* * * * *